(12) United States Patent
Tweedie et al.

(10) Patent No.: US 12,311,688 B2
(45) Date of Patent: May 27, 2025

(54) COMPOSITIONS

(71) Applicant: DataLase LTD., Widnes (GB)

(72) Inventors: Jason Tweedie, Widnes (GB); Richard Cook, Widnes (GB)

(73) Assignee: DataLase Ltd., Widnes (GB)

( * ) Notice: Subject to any disclaimer, the term of this patent is extended or adjusted under 35 U.S.C. 154(b) by 505 days.

(21) Appl. No.: 17/642,126

(22) PCT Filed: Sep. 11, 2020

(86) PCT No.: PCT/EP2020/075524
§ 371 (c)(1),
(2) Date: Mar. 10, 2022

(87) PCT Pub. No.: WO2021/048390
PCT Pub. Date: Mar. 18, 2021

(65) Prior Publication Data
US 2023/0002632 A1 Jan. 5, 2023

(30) Foreign Application Priority Data

Sep. 13, 2019 (EP) .................................... 19197336

(51) Int. Cl.
*B41M 5/28* (2006.01)
*B41M 5/46* (2006.01)
(Continued)

(52) U.S. Cl.
CPC ............ *B41M 5/284* (2013.01); *B41M 5/465* (2013.01); *B41M 7/0027* (2013.01); *C09D 11/04* (2013.01); *C09D 11/50* (2013.01); *C09D 189/00* (2013.01)

(58) Field of Classification Search
CPC ....... B41M 5/284; B41M 5/465; C09D 11/04; C09D 11/50; C09D 189/00
See application file for complete search history.

(56) References Cited

U.S. PATENT DOCUMENTS

| 1,065,115 A | 6/1913 | Danzer |
| 3,533,811 A | 10/1970 | Clements et al. |

(Continued)

FOREIGN PATENT DOCUMENTS

| EP | 0 068 907 A1 | 1/1983 |
| EP | 1 108 533 A1 | 6/2001 |

(Continued)

OTHER PUBLICATIONS

Pulver, Michael, International Search Report and Written Opinion, PCT/EP2020/075524, Inernational Searching Authority, European Patent Office, Dec. 8, 2020.

(Continued)

*Primary Examiner* — Gerard Higgins
(74) *Attorney, Agent, or Firm* — Gavrilovich, Dodd & Lindsey LLP (57) ABSTRACT

The present invention relates to a method of forming an image on a substrate comprising a transparent or translucent composition applied thereto, wherein the transparent or translucent composition comprises a protein in a non-denatured state, and the method comprises applying radiation to the transparent or translucent composition to denature the protein and thereby form an image on the substrate. The invention also relates to a method of preparing a substrate on which an image can be formed, and related substrates, compositions and uses thereof.

11 Claims, 1 Drawing Sheet

(51) Int. Cl.
    *B41M 7/00*     (2006.01)
    *C09D 11/04*     (2006.01)
    *C09D 11/50*     (2014.01)
    *C09D 189/00*     (2006.01)

(56) References Cited

U.S. PATENT DOCUMENTS

| | | | |
|---|---|---|---|
| 3,873,314 | A | 3/1975 | Woo et al. |
| 4,554,337 | A | 11/1985 | Krinski et al. |
| 6,036,808 | A * | 3/2000 | Shaw-Klein ......... B41M 5/0355 428/913 |
| 6,749,982 | B2 * | 6/2004 | Rao ..................... G03G 7/0033 430/536 |
| 2001/0044477 | A1 * | 11/2001 | Soane ..................... B01J 13/20 521/60 |
| 2015/0290345 | A1 | 10/2015 | Takahashi et al. |
| 2016/0160082 | A1 | 6/2016 | Misra et al. |

FOREIGN PATENT DOCUMENTS

| | | |
|---|---|---|
| GB | 474733 | 11/1937 |
| GB | 1217009 | 12/1970 |
| JP | 358160195 A | 9/1983 |
| JP | S6124451 A | 2/1986 |
| JP | S622221467 A | 9/1987 |
| JP | 2001-232746 A | 8/2001 |
| JP | 2001-353976 A | 12/2001 |
| JP | 2002-162732 A | 6/2002 |
| JP | 2004-345111 A | 12/2004 |
| WO | 2016/019078 A1 | 2/2016 |

OTHER PUBLICATIONS

Shukla, Rishi et al., "Zein: the industrial protein from corn", Industrial Crops and Products, vol. 13, Issue 3, May 2001, pp. 171-192.

Cinelli et al., 'Recyclability of PET/WPI/PE multilayer films by removal of whey protein isolate-based coatings with enzymatic detergents', Materials, 9:473, 2016.

Nakayam, It Is, Office Action, Application No. 2022-516029, Japan Patent Office, Feb. 27, 2024.

* cited by examiner

COMPOSITIONS

CROSS REFERENCE TO RELATED APPLICATIONS

This application is a U.S. National Stage Application filed under 35 U.S.C. § 371 and claims priority to International Application No. PCT/EP2020/075524, filed Sep. 11, 2020, which application claims priority to European Application No. 19197336.1, filed Sep. 13, 2019, the disclosures of which are incorporated herein by reference.

FIELD OF THE INVENTION

The present invention relates to a composition for forming an image on a substrate. The present invention further relates to a substrate having the composition applied thereto, and methods for preparing the substrate and forming an image on the substrate.

BACKGROUND OF THE INVENTION

In-line digital printing is a process known for the formation of images on substrates. Application of a stimulus, such as radiation from a laser source(s) effects laser-reactive compounds in compositions applied on substrates such that they display colour upon application of the radiation. Typically, to achieve formation of a white image, compounds such as sodium molybdate dihydrate or sodium carbonate are utilised in laser-reactive compositions. Upon application of radiation, the compounds undergo off-gassing, typically releasing carbon dioxide or water, which generate pockets or bubbles within the polymeric carrier vehicle of the composition. This results in a change in refractive index giving the appearance of white colour formation. However, such hydrate and carbonate compounds are highly susceptible to water which can penetrate the pockets or bubbles generated by off-gassing, resulting in loss or degradation of the image over time.

SUMMARY OF THE INVENTION

In a first aspect of the invention, there is provided a method of preparing a substrate on which an image can be formed, the method comprising applying a transparent or translucent composition comprising a protein in a non-denatured state to at least a portion of the substrate, wherein the protein can be denatured upon application of radiation to the transparent or translucent composition to thereby form an image on the substrate.

In a second aspect of the invention, there is provided a method of forming an image on a substrate comprising a transparent or translucent composition applied thereto, wherein the transparent or translucent composition comprises a protein in a non-denatured state, and the method comprises applying radiation to the transparent or translucent composition to denature the protein and thereby form an image on the substrate.

In a third aspect of the invention, there is provided a transparent or translucent composition comprising:
  a) a protein in a non-denatured state, wherein the protein can be denatured upon application of radiation to the transparent or translucent composition;
  b) an aqueous medium or solvent; and
  c) an NIR absorber.

In a fourth aspect of the invention, there is provided a transparent or translucent composition comprising:
  a) a protein in a non-denatured state, wherein the protein can be denatured upon application of radiation to the transparent or translucent composition;
  b) an aqueous medium or solvent; and
  c) a crosslinker.

In a fifth aspect of the invention, there is provided a substrate comprising a transparent or translucent composition applied thereto, wherein the transparent or translucent composition comprises:
  a) a protein in a non-denatured state, wherein the protein can be denatured upon application of radiation to the transparent or translucent composition;
  b) an aqueous medium or solvent; and
  c) an NIR absorber.

In a sixth aspect of the invention, there is provided a substrate comprising a transparent or translucent composition applied thereto, wherein the transparent or translucent composition comprises:
  a) a protein in a non-denatured state, wherein the protein can be denatured upon application of radiation to the transparent or translucent composition;
  b) an aqueous medium or solvent; and
  c) a crosslinker.

In a seventh aspect of the invention, there is provided a use of a transparent or translucent composition comprising a protein in a non-denatured state, wherein the protein can be denatured upon application of radiation to the transparent or translucent composition, to form an image on a substrate.

BRIEF DESCRIPTION OF THE DRAWINGS

The invention is illustrated with the accompanying drawings wherein.

DETAILED DESCRIPTION OF THE INVENTION

It has been surprisingly and advantageously realised by the present inventors that proteins can be utilised in compositions, in particular laser-reactive compositions, to achieve effective formation of human and/or machine-readable images. In particular, white or off-white images can be advantageously formed. The composition of the present invention is transparent or translucent upon formulation, and application to a substrate(s). Upon application of radiation to selected areas of the composition on the substrate, a white or off-white image can be formed at these selected areas whilst the areas of the composition to which the radiation has not been applied (background) are unaffected.

Furthermore, the use of proteins is advantageous in comparison to traditional laser-reactive compositions utilising hydrate and carbonate compounds. Such compounds are only soluble in water-based systems, meaning that printing speeds are restricted when the compounds are utilised. In contrast, proteins may be solubilised in alkaline aqueous solutions or solvents such as alcohols, esters and ketones, enabling high-speed printing using commercial printing techniques such as solvent-based gravure and flexographic printing.

Furthermore, the compositions of the invention demonstrate improved water and environmental resistance over those of the prior art. The use of the compositions of the invention in conjunction with any protective overcoat layers applied thereon or utilised therewith such as overprint varnishes or laminates, also serves to further improve water and environmental resistance. Still further, as proteins are biodegradable materials, the compositions of the invention are environmentally friendly.

It has further been surprisingly and advantageously found that proteins can be utilised in the compositions of the present invention as both the component achieving image formation and the binder of the composition. Manufacture of the compositions is therefore significantly simplified in comparison to that of traditional compositions.

It will be appreciated that the proteins of the compositions of the invention act as the image-forming component of the compositions. Advantageously, this means that no pigments or dyes are required to be present in the compositions for colour formation purposes.

According to a first aspect of the invention, there is provided a method of preparing a substrate on which an image can be formed, the method comprising applying a transparent or translucent composition comprising a protein in a non-denatured state to at least a portion of the substrate, wherein the protein can be denatured upon application of radiation to the transparent or translucent composition to thereby form an image on the substrate.

By "non-denatured state" is meant the state of the protein in which it assumes its preferred conformational state. This is the most energetically favourable natural state of the protein. The non-denatured state is typically a folded highly specific three-dimensional structure. The protein is operative and functional in its non-denatured state. In the non-denatured state, the protein has not been subjected to denaturation through application of any stimulus, such as radiation, and may be biologically active. In the non-denatured state, the protein is not visible to the human eye in the composition and the composition comprising the protein in the non-denatured state is transparent or translucent. The protein is stable in the non-denatured state at ambient conditions. It therefore remains in the non-denatured state until the specific application of radiation to the composition and thus, the protein itself. "Ambient conditions" and like terms as used herein, refers to the normal range of conditions of the surrounding environment to which the composition, and thus the protein, is exposed, i.e. the range of temperatures, pressures and atmospheric conditions to which the composition and thus the protein is exposed during use, storage and otherwise. This includes solar radiation including electromagnetic radiation of X-rays, ultraviolet (UV) and infrared (IR) radiation. Typically, ambient conditions include a temperature of from 10 to 35° C., a pressure of from 20 to 100 kPa, and the environment is typically an oxygen-containing atmosphere.

Upon application of radiation to selected areas of the transparent or translucent composition on the substrate, an image is formed through denaturation of the protein in the areas of the composition exposed to the radiation. Upon application of the radiation, the protein undergoes a conformational change. The term "conformational change" of a protein is well-known to the skilled person to refer to a change in the shape of a protein in response to changes in its environment or other factors; each possible shape is called a conformation. Conformational changes may be brought about by alterations of the interchain crosslinking (i.e. hydrogen bonding, dipole-dipole interactions), protein unfolding and precipitation. Factors that may induce such changes include temperature, pH, voltage, light in chromophores, ion concentration or phosphorylation. In the context of the present invention, the conformational change is facilitated by the application of radiation. The conformational change can be considered a transition from the non-denatured state of the protein to the denatured state of the protein in the areas of the composition that have been exposed to the radiation. During this transition, the protein becomes visible to the human eye in the composition. In the denatured state, the protein is visible to the human eye in the composition. The denatured state of the protein is typically white or off-white in colour, such that the image formed on the substrate is white or off-white in colour. It will be appreciated by a skilled person that in the areas of the composition to which the radiation has not been applied, the protein remains in the non-denatured state and the composition in these areas is transparent or translucent. The denaturation and conformational change of the protein is an irreversible process, therefore once the protein is in the denatured state following application of radiation; it will remain in this state without fading or reverting back to a non-denatured state. The protein is visible to the human eye in the composition in the denatured state, facilitating the formation of an image. Without being bound by theory, in the context of the present invention, the inventors consider that upon application of the radiation, a conformational change and agglomeration and crosslinking of polypeptide subunits of protein occurs such that the protein is denatured and becomes visible to the human eye in the composition, typically displaying a white or off-white colour.

As mentioned above, the protein is stable in the non-denatured state at ambient conditions so that it does not undergo a conformational change and is not denatured prior to the specific application of radiation to the composition on the substrate. Suitably, the protein transitions from the non-denatured state to a denatured state, i.e. is denatured, at temperatures of above 40° C., preferably above 45° C., more preferably above 50° C., even more preferably above 55° C. and yet more preferably above 60° C.

In the context of the present invention, the protein is visible to the human eye in the composition once denatured, i.e. in a denatured state. In the context of the present invention, the denatured protein typically displays a white or off-white colour in the areas of the composition to which the radiation has been applied. It will be appreciated by a skilled person that the areas of the composition to which the radiation has not been applied (background) will remain unaffected, and the protein will remain in a non-denatured state in these areas. The term "white", "white colour" or "off-white" encompasses pure or absolute white, in addition to any shades or tints thereof.

In the context of the present invention, the effective formation of an image is determined by measurement of an opacity value. In the context of the present invention, opacity is a measure of the impenetrability of the composition to light, in this instance, visible light. Opacity is expressed as a percentage from transparent (0%) to opaque (100%). The percentage is a measure of the amount of light that does not pass through the composition, i.e. at 0% opacity, the composition is completely transparent as 0% of the light does not pass through the composition, and at 100% opacity, the composition is completely opaque as 100% of the light does not pass through the composition. In the context of the present invention, opacity values of both the areas of the composition to which radiation has been applied (image) and the areas of the composition to which the radiation has not been applied (background) can be measured in order to demonstrate the effective formation of a discernible human and/or machine-readable image. It will be appreciated by a skilled person that in the context of the present invention, the opacity of the image is greater than the opacity of the background, such that a discernible human and/or machine-readable image is formed. The greater the difference between the opacity values of the image and the background, the more distinct and discernible the image is. It will be further appreciated by a skilled person that the opacity values for the areas of the composition to which the radiation has not been applied are equivalent to those of the transparent or translucent composition applied to the substrate prior to application of radiation.

For the present invention, the transparent or translucent composition and the areas of the imaged composition to which the radiation has not been applied may have an opacity of 20% or less, such as from 15% or less, preferably 10% or less, or even 5% or less. Further, in the context of the present invention, the areas of the imaged composition to which the radiation has been applied and an image formed thereon may have an opacity of 40% or more, such as 45% or more, preferably 50% or more, or even 60% or more, such as 70% or more. It will be appreciated that the higher the opacity value of the image, the more distinct and discernible the image formed. A high opacity value thus denotes effective image formation.

In the context of the present invention, opacity measurements are made using the opacity function of a Techkon SpectroDens spectrophotometer according to ASTM standard ASTM D589-97, and the imaged (image) and unimaged (background) areas of the composition on the substrate are each measured relative to black and white standards. First, the opacity function of the Techkon SpectroDens spectrometer is selected, the opacity of a composition on the substrate is then measured relative to a black Leneta chart, the opacity of the composition on the substrate is then measured relative to a white background such as minimum 50 sheets of white paper, and the resulting opacity measurement displayed by the Techkon SpectroDens spectrometer.

In the context of the present invention, it will be appreciated that when the transparent or translucent composition is applied to a substrate, the substrate itself, as well as any colour thereof, will typically be visible through the composition in light of its transparent or translucent nature. After formation of the image, this will typically remain the same for the areas of the composition to which the stimulus has not been applied.

In the context of the present invention, the terms "transparent" and "translucent" refer to the composition prior to application of the stimulus, or the areas of the imaged composition to which the stimulus has not been applied. This transparent or translucent composition may be substantially colourless, preferably colourless.

It will be appreciated by a skilled person that the protein is the "image-forming compound" of the composition. By "image-forming compound" is meant that following application of the composition to the substrate, the protein will form a discernible image on the substrate upon exposure of the composition, and thus the protein, to the radiation. The discernible image is human and/or machine-readable. In the context of the present invention, the discernible image formed by the protein will typically be white or off-white in colour. By discernible image is meant that the image is distinct and easily discernible from the background of the composition, i.e. the areas of the composition that have not been exposed to the radiation. It will be appreciated that in light of the transparent or translucent nature of the composition, the substrate itself, as well as any colour thereof, will typically by visible through the areas of the composition where an image has not been formed. It is therefore preferable that the colour of the substrate upon which the transparent or translucent composition is applied is selected such that the image formed is distinct and easily differentiable therefrom. For example, if the image is white in colour, the substrate may be any colour in the visible spectrum that contrasts with white, such as red, blue, green, orange, purple, brown and black, including any shade or tint thereof or special effect such as pearlescent or metallic. The greater the contrast, the more distinct the image. It will further be appreciated that in instances in which the substrate itself is transparent or translucent, such as a polymeric film, any further substrate to which the substrate is attached may demonstrate the above properties.

The protein may be any suitable protein. More than one protein may be present in the composition. The protein may be sourced from a range of natural resources, including animal, dairy and plant proteins. Preferably, the protein is selected from an animal or plant protein. More preferably, plant proteins are selected due to their biodegradable and environmentally-friendly nature. Examples of animal proteins include, but are not limited to: collagen (hydrolysed or non-hydrolysed) such as hydrolysed bovine collagen; and gelatine. Examples of dairy proteins include, but are not limited to: egg white; whey; and casein. Examples of plant proteins include, but are not limited to: prolamine proteins, such as gluten, zein, soy, pea and hemp.

Preferably, the protein is selected from a prolamine protein and collagen such as hydrolysed collagen such as hydrolysed bovine collagen. More preferably, the protein is selected from zein and collagen such as hydrolysed collagen such as hydrolysed bovine collagen.

It will be appreciated that the protein of the invention is capable of absorbing laser light.

All references to particular proteins herein are to be interpreted as covering the proteins per se, and also, where appropriate, derivatives, for example peptides or functionalised proteins.

The protein may be present in the composition in any suitable amount. Preferably, the composition comprises from 0.1 to 50 wt %, such as from 0.1 to 40 wt %, or even from 3 to 30 wt % of the protein. Most preferably, the composition comprises from 5 to 25 wt % of the protein.

It will be appreciated by a skilled person that the greater the content of the protein in the composition, the higher the opacity value of the image formed, i.e. the more distinct the image formed. However, it will be appreciated by a skilled person that a balance between the amount of protein in the composition and viscosity of the composition must be found.

The protein is solubilised in the composition upon formulation of the composition and prior to application of the composition to the substrate. It will be appreciated that different proteins solubilise at different pHs. Accordingly, the pH of the composition may vary as the solubility of different proteins varies. Some will be more soluble in higher or lower pHs. However, typically extreme pH values, such as pH 1 or pH 14 will often cause the proteins to undergo a conformational change before the application of the stimulus, which is undesirable. Thus, suitably the composition will have a pH of from 2 to 12.5, preferably 3 to 11.5. The composition may comprise a neutral medium, i.e. the composition consequently has a pH of about 7.

The composition may comprise an aqueous medium in which the protein is solubilised upon formulation of the composition and prior to application of the composition to the substrate. The composition may comprise an alkaline aqueous medium, such as water with ammonia, monoethanolamine or other amine-based materials and carbonates.

This may be formed through the addition of an aqueous solution containing ammonia, monoethanolamine or other amine-based materials and carbonates to water. The composition may comprise an acidic aqueous medium, such as acetic acid, hydrochloric acid and other acid-based chemicals. Preferably, the composition comprises an alkaline aqueous medium, such as water with ammonia, monoethanolamine, or other amine-based materials and carbonates, preferably monoethanolamine.

Alternatively, the composition may comprise a solvent in which the protein is solubilised upon formulation of the composition and prior to application of the composition to the substrate. The composition may comprise a single solvent or a mixture of solvents. The solvent may comprise water, an organic solvent, a mixture of water and an organic solvent, or a mixture of organic solvents. A base such as ammonia, monoethanolamine or other amine-based materials and carbonates may optionally be present in the solvent. Suitable organic solvents include, but are not limited to the following: alcohols such as ethanol, n-propanol, isopropanol and n-butanol; esters such as ethyl acetate, butyl acetate, and n-hexyl acetate; aromatic hydrocarbons such as benzene, toluene, xylene, and solvent naphtha 100, 150, 200; ketones such as acetone, cyclohexanone, methylisobutyl ketone, and methyl ethyl ketone; glycols such as butyl glycol; glycol ethers such as methoxypropanol, ethylene glycol monomethyl ether, ethylene glycol monobutyl ether; and combinations thereof. Preferably, the composition comprises water and/or an organic solvent. More preferably, the composition comprises water and/or an alcohol, acetate or ketone. More preferably, the composition comprises water and/or an alcohol or ketone. More preferably, the composition comprises water and/or an alcohol. More preferably the composition comprises water and/or ethanol.

Preferably, the aqueous medium or solvent is present in the composition in amounts of from 15 to 80 wt %, such as from 15 to 70 wt %, such as from 15 to 60 wt %, or even from 20 to 55 wt %.

It will be appreciated by a skilled person that the protein is solubilised in the aqueous medium or solvent of the composition upon formulation of the composition and prior to application of the composition to the substrate. The aqueous medium or solvent, and any components thereof, are present at levels such that the protein remains solubilised in the solvent or aqueous medium upon formulation, and prior to application of the composition to the substrate. Upon application to the substrate, it will be appreciated that the majority of the aqueous medium or solvent is lost by virtue of the application methods detailed herein.

The composition may further comprise a biocide, such as isothiazolinones, cationic quaternary salts e.g. ammonium/phosphonium, amines, urea, benzoic acid/sorbate salts. More than one biocide may be present in the composition. Biocides increase the stability, i.e. shelf life of the protein and includes surfactants that possess biocidal properties and protein stabilisation capabilities. Example surfactants include but are not limited to, alkyl sulfate salts e.g. Dioctyl Sodium Sulfosuccinate (DSS), Sodium Lauryl Sulfate (SLS), Sodium Dodecyl Sulfate (SDS); Carboxylate salts e.g. Sodium Stearate; Sorbates e.g. Sodium sorbate (SS), Polysorbates e.g. Polysorbate 20 (aka Tween 20); Amine Oxides e.g Lauryldimethylamine Oxide; Phosphate esters. Additionally, non-conventional biocides could be used, i.e. preservatives typically used for food stuffs, such as sodium nitrates/nitrites, Lauryldimethylamine oxide (LDAO) and ascorbic acid. The composition may comprise from 0.001 to 5 wt % of a biocide, such as from 0.1 to 5 wt %, or even 0.1 to 1 wt %, and preferably 0.1 to 0.5 wt %.

Typically, compositions of the prior art require a binder to be present in the compositions to effectively bind the composition to a substrate. However, it has been found by the inventors that an additional binder is not a necessity in the compositions of the invention, and that the protein performs this function itself. Thus, the composition typically contains no binder in addition to the protein.

Alternatively, in order to further increase the strength of the binding of the composition to the substrate, the composition may comprise a binder in addition to the protein. Suitable binders will be well known to a person skilled in the art. Examples of suitable binders include, but are not limited to the following: polymeric binders such as acrylic polymers, styrene acrylic polymers and hydrogenated products thereof; vinyl polymers; polyolefins and hydrogenated or epoxidised products thereof; aldehyde-containing polymers; epoxide-containing polymers; polyamides; polyesters; polyurethanes; sulphone-containing polymers; natural products and derivatives thereof; and combinations thereof. The binder may be present in the composition in any suitable amount. Preferably, the composition comprises from 1 to 40 wt %, such as from 3 to 30 wt % and most preferably, from 5 to 20 wt % of binder.

The composition may further comprise a near-infrared (NIR) absorber. The NIR absorber may be any suitable compound that is capable of absorbing near-infrared radiation. More than one NIR absorber may be present in the composition. Examples of suitable NIR absorbers include, but are not limited to the following: inorganic copper salts such as copper (II) hydroxyl phosphate; organic NIR dyes and pigments such as N,N,N',N'-tetrakis(4-dibutylaminophenyl)-p-benzoquinone bis(iminium hexafluoro-antimonate); non-stoichiometric, reduced or doped inorganic compounds such as reduced indium tin oxide, reduced zinc oxide, reduced tungsten oxide (tungsten bronze), reduced doped tungsten oxide including an inorganic compound of the following formula $M_xW_yO_z$ (where M is at least one element selected from the group consisting of H, He, alkali metal, alkaline earth metal, rare earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying $0.001 \leq x/y \leq 1$; and $2.2 \leq z/y \leq 3.0$), reduced antimony tin oxide, or doped metal oxides such as aluminium-doped zinc oxide (AZO) and fluorine-doped tin oxide (FTO); conductive polymers such as poly polystyrene sulfonate (PEDOT); and combinations thereof.

Preferably, the NIR absorber is selected from inorganic copper salts such as copper (II) hydroxyl phosphate; non-stoichiometric, reduced or doped inorganic compounds such as reduced indium tin oxide, reduced zinc oxide, reduced tungsten oxide (tungsten bronze), reduced doped tungsten oxide including an inorganic compound of the following formula $M_xW_yO_z$ (where M is at least one element selected from the group consisting of H, He, alkali metal, alkaline earth metal, rare earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying $0.001 \leq x/y \leq 1$; and $2.2 \leq z/y \leq 3.0$), reduced antimony tin oxide, or doped metal oxides such as aluminium-doped zinc oxide (AZO) and fluorine-doped tin oxide (FTO).

It will be appreciated by a skilled person that an intensely coloured (highly visibly coloured) NIR absorber, such as carbon black, is not appropriate for the composition of the present invention. Such an intensely coloured NIR absorber would create a highly-coloured background for a composition. In contrast, the composition of the present invention is transparent or translucent upon application to the substrate. NIR absorbers of low visible colour are therefore required. An intensely coloured NIR absorber would be detrimental to the present invention. 'Visibility' in this context is meant visibility to the human eye.

Preferably, the NIR absorber is not a highly visibly coloured NIR absorber. Preferably, the NIR absorber is not a highly visibly coloured pigment or dye. Preferably, the composition does not comprise carbon black.

It will be appreciated by a skilled person that when near-infrared radiation is utilised to form an image, an NIR absorber is preferably present in the composition of the invention.

The NIR absorber absorbs the near-infrared radiation and transfers this energy to the protein as heat to cause denaturation of the protein and facilitate the transition from the non-denatured state to the denatured state to thereby form an image.

The composition may comprise from 0.05 to 25 wt %, such as from 0.05 to 20 wt % of an NIR absorber.

The NIR absorber may have any suitable D50 particle size distribution value. Preferably, the D50 particle size distribution value of the NIR absorber is 5 μm or less. More preferably, the D50 particle size distribution value of the NIR absorber is from 0.5 to 3 μm, and most preferably from 1 to 2 μm.

D50 particle size distribution is measured using a Malvern Mastersizer according to ISO standard 13320:2009.

The composition may further comprise a crosslinker. The crosslinker may be any suitable thermosetting or radiation-reactive crosslinking material, including crosslinking resins, polymers, and monomers. In the context of the present invention, by "thermosetting or radiation-reactive crosslinking material" is meant a material that crosslinks upon application of the radiation to the composition. Suitable examples of crosslinkers include, but are not limited to: melamine-based crosslinkers including alkylated melamine-based crosslinkers such as those supplied by Allnex under the tradename Cymel, including Cymel XW3106, Cymel NF-3041, and Cymel 303LF; as well as other reactive crosslinkable materials such as UV-curable monomers, oligomers and photoinitiator systems or epoxy or isocyanate materials.

Preferably, the crosslinker is a melamine-based crosslinker, such as an alkylated melamine crosslinker. More preferably, the crosslinker is a melamine-based crosslinker selected from Cymel XW3106, and CymelNF-3041. More preferably, the crosslinker is the melamine-based crosslinker Cymel XW3106.

The crosslinker is preferably accompanied in the composition by a catalyst. Suitable examples of catalysts include, but are not limited to: sulfonic acid catalysts such as those supplied by Allnex under the tradename Cycat, including Cycat 500 (dinonylnaphthalene disulfonic acid) and Cycat 600 (dodecylbenzene sulfonic acid).

Preferably, the catalyst is dodecylbenzene sulfonic acid (Cycat 600).

It has been surprisingly and advantageously found that the incorporation of a crosslinker and typically an accompanying catalyst, into the compositions of the present invention, increases the water, and thus environmental resistance of the compositions. This is particularly the case when the protein is selected to be plant protein, in particular a prolamine protein such as zein. Increased water and environmental resistance is demonstrated by maintenance of the opacity value of the imaged areas of the composition following exposure to or immersion in water.

It has been further surprisingly and advantageously identified that the incorporation of a crosslinker and typically an accompanying catalyst into the composition of the present invention increases water and environmental resistance and further improves the image formed (higher opacity value) when the protein is selected to be plant protein, in particular a prolamine protein such as zein, and the crosslinker is a melamine-based crosslinker, such as an alkylated melamine-based crosslinker such as Cymel XW3106.

The use of crosslinkers, in particular the highly functional crosslinkers discussed above, in the compositions of the present invention enhances the crosslinking density of the proteins upon application of the radiation. It will be appreciated by a skilled person that this increased crosslinking density means that the non-reactivity of the protein in the denatured state is also increased following application of the radiation, i.e. the irreversibility of the denaturation of the protein is further supported.

The composition may further comprise an opacity-enhancing agent. By 'opacity-enhancing agent' is meant a compound that increases the degree of opacity of the imaged areas of the composition to which radiation has been applied. Suitable examples of opacity-enhancing agents include, but are not limited to metal hydrates such as aluminium hydroxide hydrate and calcium oxalate hydrate. Preferably, the composition comprises from 0.1 to 20 wt %, such as from 0.1 to 15 wt %, or even from 0.1 to 10 wt % of an opacity-enhancing agent.

The composition may further comprise an additive or combination of additives. Suitable additives will be well known to a person skilled in the art. Examples of suitable additives include, but are not limited to the following: polymers; light or energy absorbing agents; UV absorbers; surfactants; wetting agents; drying promoters; colourants such as pigments; tinting agents; fluorescent agents; plasticisers; optical brighteners; oxidising or reducing agents; stabilisers; light stabilising agents such as hindered amines; rheology modifiers such as thickening or thinning agents; humectants; adhesion promotors; acid or base scavenging agents; retarders; defoamers; antifoaming agents; and combinations thereof. Preferably, the composition comprises 0.1 to 25 wt %, such as from 0.1 to 20 wt %, such as from 0.1 to 15 wt %, such as from 0.1 to 12 wt %, or even from 0.1 to 10 wt % of an additive or combination of additives.

Preferably, the composition does not comprise a pigment or dye.

The composition may have a viscosity of from 14 to 120 Zahn seconds (efflux time), suitably measured using a Zahn cup #2 viscosity measurement device at a temperature of 16 to 30° C. It will be appreciated that the viscosity of the composition is dependent upon a number of factors, including the type, amount and solubility of the protein present in the composition, in addition to allowing the formulator to control the desired viscosity of a particular composition.

The composition may be formulated with the protein in a dry powder form, such as in a dehydrated form e.g. freeze dried or spray dried.

The composition may be formed by any suitable method, which will be well known to a person skilled in the art. Preferably, the NIR absorber is milled prior to addition to the other components of the composition, using a mechanical bead mill, such as an Eiger Torrance M50 mechanical bead mill.

Examples of suitable substrates to which the composition may be applied or incorporated, include, but are not limited to: polymers and recycled polymer materials such as polyethylene terephthalate (PET), polyethylene (PE), low density polyethylene (LDPE), high density polyethylene (HDPE), polystyrene (PS), polypropylene (PP), orientated polypropylene (OPP), biaxially orientated polypropylene (BOPP), cast polypropylene (CPP), polyamide (PA) such as nylon, polyvinyl chloride (PVC), or combinations thereof; cellulose; glass; plastic; metal and metal foils; textiles; paper; corrugated paperboard, cardboard, and equivalent recycled analogues, or combinations thereof; ceramics; foodstuffs and pharmaceutical preparations; or combinations thereof. The polymer and recycled polymer materials may be in the form of polymer film substrates. Preferably the substrate is a polymeric film, a metal, paper, cardboard, plastic or carton board. More preferably, a polymeric film.

The substrate may be clear. The substrate may be transparent, translucent or opaque, preferably transparent or translucent.

The composition, or substrate to which the composition has been applied to or incorporated within, may be suitable for end use in, in labels (adhesive or wraparound) and/or, fast-moving consumer goods; packaging such as disposable packaging including food and hot or cold beverage containers or labels or folding cartons; folding cartons; coated paper; can ends; decorative metal products; blister pack packaging; hygiene and personal care product packaging such as shampoo bottles; cosmetic product packaging; and medical and diagnostic devices and associated packaging. The composition or substrate to which the composition has been applied to or incorporated within may be used for coding and marking, tagging, tracking and tracing and late-stage customisation or personalisation purposes.

It will be appreciated by a skilled person that the substrate to which the composition has been applied to or incorporated within may itself be applied to a further substrate. Examples of further substrates include, but are not limited to the following: polymers and recycled polymer materials such as polyethylene terephthalate (PET), polyethylene (PE), low density polyethylene (LDPE), high density polyethylene (HDPE), polystyrene (PS), polypropylene (PP), orientated polypropylene (OPP), biaxially orientated polypropylene (BOPP), cast polypropylene (CPP), polyamide (PA) such as nylon, polyvinyl chloride (PVC), or combinations thereof; cellulose; glass; plastic; metal and metal foils; textiles; paper; corrugated paperboard, cardboard, and equivalent recycled analogues, or combinations thereof; ceramics; foodstuffs and pharmaceutical preparations; or combinations thereof. The polymers and recycled polymer materials may be in the form of polymer film substrates.

Preferably, the substrate comprises an additional adhesive layer. It will be appreciated that this additional adhesive layer is operable to apply the substrate to the further substrate or any other material and is therefore on an exterior surface of the substrate. The adhesive layer may cover all, substantially all, or part of the surface area of an exterior surface of the substrate.

The composition may be applied to the substrate by any suitable method. Methods of applying the composition to a substrate will be well known to a person skilled in the art. Suitable application methods include, but are not limited to the following: flexographic printing, gravure printing, screen printing, offset printing and meyer bar coating. The composition may be applied to all, substantially all or a portion of the surface area of an exterior surface of the substrate.

The composition may be applied on a substrate to any suitable coat weight. It will be appreciated that the coat weight of the composition on the substrate will affect the optical density of the image formed.

The composition may be applied to the substrate to a coat weight of from 0.1 to 15 gsm (grams per square metre), such as from 0.1 to 12 gsm, or even 0.1 to 10 gsm. Preferably, the composition is applied to the substrate to a coat weight of from 0.1 to 8 gsm. This coat weight is per individual layer of the composition that may be applied to the substrate.

The coat weight may be measured by any suitable method. Suitable measuring methods will be known by those skilled in the art. Preferably, the coat weight is measured by weighing the same area of substrate with and without the composition applied thereto, and comparing the two weights. Typically, this is an average of several datasets.

The composition may be applied to the substrate as a single layer or in multiple layers, i.e. once or multiple times.

The composition may be applied to the substrate as an undercoat or overcoat, on top of a primer or as a primer layer. The composition may also be applied over a base layer and/or under a protective overcoat or varnish layer. The composition may be applied to the substrate as part of a multi-layer system. A protective overcoat layer, such as a overprint varnish, a film or a laminate, may be applied over the composition on the substrate.

Suitable protective overcoat layers, such as overprint varnishes include commercially available cold seal release lacquers. Such cold seal release lacquers typically comprise nitrocellulose and/or polyamide resins as the main component. Cold seal release lacquers may thus include nitrocellulose and/or polyamide resins as well as a solvent. In order to provide an overprint varnish having good slipping and anti-blocking properties, waxes, fatty acid amide waxes, paraffin or silicone-based additives are also typically included in the composition from which the lacquer is prepared. Suitable cold seal release lacquers are commercially available from InkTech.

When a protective overcoat layer such as an overprint varnish is applied over the composition of the invention on the substrate, further improvement in the water resistance and thus environmental resistance of the composition is observed. This is through the maintenance of the opacity value of the imaged areas of the composition to which radiation has been applied upon exposure to or immersion in water. Furthermore, use of a protective overcoat layer such as an overprint varnish in conjunction with the composition of the present invention can also result in improved image formation (higher opacity value) when the protective overcoat layer is glossy in nature such that haze is reduced.

The application of the composition to the substrate, enables an image to be formed on the substrate.

Thus, according to a second aspect of the present invention there is provided a method of forming an image on a substrate comprising a transparent or translucent composition applied thereto, wherein the transparent or translucent composition comprises a protein in a non-denatured state, and the method comprises applying radiation to the transparent or translucent composition to denature the protein and thereby form an image on the substrate.

For the second aspect of the present invention, the transparent or translucent composition or substrate may have any of the features described herein as preferred, optional or otherwise with regard to the any of the other aspects of the present invention.

The term "image" incorporates, but is not limited to: text, logos, marks, graphics, figures, pictures and symbols. It will be appreciated that in the context of the present invention, it is the manipulation of the protein of the composition as the image-forming compound that facilitates the formation of an image. The image formed will be human and/or machine readable, and can be used for coding and marking, tagging tracking and tracing and late-stage customisation or personalisation purposes.

"Printing", "in-line digital printing" or "laser printing" and like terms as used herein, refer to the process of using radiation to achieve image formation on a substrate. "Radiation" and like terms as used herein, refers to energy in the form of waves or particles, and in particular, refers to electromagnetic radiation such as ultraviolet (UV), visible, near-infrared (NIR), and infrared (IR) particle radiation, e.g. alpha ($\alpha$) radiation, beta ($\beta$) radiation, neutron radiation and plasma.

By the term "laser source(s)" and like terms as used herein includes any suitable commercial non-contact laser source (s), such as a $CO_2$ laser.

Radiation may be applied to the composition on the substrate in order to facilitate formation of an image. It will be appreciated by a skilled person that the radiation will be selected so as to cause the 'image-forming compound', i.e. the protein, to be denatured, forming a discernible image.

The radiation may constitute radiation selected from gamma radiation with a wavelength of less than 0.01 nm, X-ray radiation with a wavelength of from 0.01 to 10 nm, ultraviolet (UV) radiation with a wavelength of from 10 to 400 nm, visible radiation with a wavelength of from 400 to 700 nm, infrared radiation with a wavelength of from 700 nm to 1 mm, infrared radiation with a wavelength of from 9000 nm to 11000 nm including 10600 nm (applied using a $CO_2$ laser), near infrared radiation with a wavelength of from 700 nm to 1600 nm, and microwave radiation with a wavelength of from 1 mm to 1 m. Preferably, the radiation is selected from infrared radiation with a wavelength of from 700 nm to 1 mm, infrared radiation with a wavelength of from 9000 nm to 11000 nm including 10600 nm (applied using a $CO_2$ laser), near infrared radiation with a wavelength of from 700 nm to 1600 nm, visible radiation with a wavelength of from 400 to 700 nm, and ultraviolet (UV) radiation with a wavelength of from 100 to 400 nm. More preferably, the radiation is selected from infrared radiation with a wavelength of from 700 nm to 1 mm, infrared radiation with a wavelength of from 9000 nm to 11000 nm including 10600 nm (applied using a $CO_2$ laser), near infrared radiation with a wavelength of from 700 nm to 1600 nm, and ultraviolet (UV) radiation with a wavelength of from 100 to 400 nm. More preferably, the radiation is selected from infrared radiation with a wavelength of from 700 nm to 1 mm, infrared radiation with a wavelength of from 9000 nm to 11000 nm including 10600 nm (applied using a $CO_2$ laser), and near infrared radiation with a wavelength of from 700 nm to 1600 nm. Most preferably, the radiation is selected from infrared radiation with a wavelength of from 9000 nm to 11000 nm including 10600 nm (applied using a $CO_2$ laser), and near infrared radiation with a wavelength of from 700 nm to 1600 nm.

It will be appreciated that from the radiation and wavelength ranges detailed herein, a skilled person would select radiation of a specific wavelength as required to achieve denaturation of the protein and cause the protein to transition from the non-denatured state to the denatured state as discussed above. It will be appreciated that the specifically selected applied radiation may differ depending upon the protein present in the composition.

The radiation may be applied to the protein of the composition by any suitable means. Suitable means include laser excitation through application of radiation to the composition and thus the protein by a laser source(s). It will be understood by a skilled person that when the composition is applied on a substrate, the radiation may be applied to the composition on the substrate at localised positions to selectively develop the denatured state of the protein at these localised positions in the composition. These localised positions may overlap with each other. It will also be understood by a skilled person that the radiation is applied to the composition for an appropriate amount of time required to facilitate the conformational change of the protein (denaturation) and the transition from the non-denatured state to the denatured state. Typically the time required to deliver sufficient radiation will depend upon the power of the means used to apply radiation.

It will be appreciated that when applied using a laser source(s), the radiation dosage applied to the composition can be controlled by alteration of the time for which the radiation is applied, the power of the means used to apply the radiation (wattage) and thus, the fluence (amount of energy delivered per unit area) delivered by a laser source(s), e.g. $J/cm^2$. It will be appreciated by a skilled person that this may affect the opacity value of the image formed. For example, where a laser source(s) is used to apply the radiation, the fluence (amount of energy delivered per unit area) may affect the opacity value of the image formed.

In the context of the present invention, the fluence is dependent upon the power of the means used to apply the radiation (wattage), and the time for which the radiation is applied to a particular localised position of the composition on the substrate, which may be controlled by the scanning speed of the laser or the speed of the moving stage. These two variables can be altered to change the fluence. Where the fluence is low (e.g. lower power and/or shorter irradiation times), the image formed will have a lower opacity value, and where the fluence is high (e.g. higher power and/or longer irradiation times), the image formed will have a higher opacity value. In the context of the present invention, fluence values may range from 0.01 to 20 $J/cm^2$, such as from 0.1 to 10 $J/cm^2$, and even from 0.5 to 5 $J/cm^2$ or 1 to 5 $J/cm^2$.

As discussed above, the protein suitably undergoes a conformational change, i.e. is denatured and transitions from the non-denatured state to the denatured state, at temperatures of above 40° C., preferably above 45° C., more preferably above 50° C., even more preferably above 55° C. and yet more preferably above 60° C. It will therefore be appreciated that the radiation provides thermal energy to the protein such that the protein is heated to a temperature of above 40° C., preferably above 45° C., more preferably above 50° C., even more preferably above 55° C. and yet more preferably above 60° C. Suitably, the protein is heated to a temperature of below 150° C., preferably below 140° C., more preferably below 130° C., yet more preferably below 120° C. Suitably, the protein is heated to a temperature of from 40 to 150° C., such as from 45 to 140° C., or even from 50 to 130° C., or 55 to 120° C., or 60 to 120° C.

Preferably, the radiation is applied to the composition at localised positions of the composition in order to form a desired image. Essentially, upon application of the radiation, the protein is denatured at the areas of the composition on the substrate to which the radiation has been applied. A human and/or machine-readable image is thus generated. It is the protein functioning as the 'image-forming compound' of the composition that enables an image to be formed. Preferably, for the present invention, the image formed is white in colour. Preferably, the denatured state of the protein is white in colour, such that a white image is formed. The background of the composition to which radiation has not been applied is unaffected.

In a third aspect of the invention, there is provided a transparent or translucent composition comprising:
 a) a protein in a non-denatured state, wherein the protein can be denatured upon application of radiation to the transparent or translucent composition;
 b) an aqueous medium or solvent; and
 c) a NIR absorber.

For the third aspect of the present invention, the transparent or translucent composition may have any of the features described herein as preferred, optional or otherwise with regard to any of the other aspects of the present invention.

In a fourth aspect of the invention, there is provided a transparent or translucent composition comprising:
 a) a protein in a non-denatured state, wherein the protein can be denatured upon application of radiation to the transparent or translucent composition;
 b) an aqueous medium or solvent; and
 c) a crosslinker.

For the fourth aspect of the present invention, the transparent or translucent composition may have any of the features described herein as preferred, optional or otherwise with regard to any of the other aspects of the present invention.

In a fifth aspect of the invention, there is provided a substrate comprising a transparent or translucent composition according to the third aspect of the present invention applied thereto.

For the fifth aspect of the present invention, the transparent or translucent composition or substrate may have any of the features described herein as preferred, optional or otherwise with regard to any of the other aspects of the present invention.

In a sixth aspect of the invention, there is provided a substrate comprising a transparent or translucent composition according to the fourth aspect of the present invention applied thereto.

For the sixth aspect of the present invention, the transparent or translucent composition or substrate may have any of the features described herein as preferred, optional or otherwise with regard to any of the other aspects of the present invention.

In a seventh aspect of the invention, there is provided a use of a transparent or translucent composition comprising a protein in a non-denatured state, wherein the protein can be denatured upon application of radiation to the transparent or translucent composition, to form an image on a substrate.

For the seventh aspect of the present invention, the transparent or translucent composition may have any of the features described herein as preferred, optional or otherwise with regard to any of the other aspects of the present invention. In particular, the transparent or translucent composition may be the transparent or translucent composition of either of the third or fourth aspects of the present invention.

The invention will now be further illustrated by the following non-limiting examples.

EXAMPLES

For each of the examples, NIR radiation was applied using a fibre NIR laser with a wavelength of 1070 nm. For each of the examples, the fluence delivered by the fibre NIR laser applied was in the range of 1 to 4 $J/cm^2$.

For each of the examples, the image formed was white or off-white in colour.

For each of the examples, the formulated compositions were transparent or translucent upon application to the substrate.

The following Compositions 1 to 7 comprising a protein in a non-denatured state were formulated as set out below. All amounts are provided in weight percentage (wt %).

Composition 1

| Components | Wt % |
| --- | --- |
| Water | 67.00 |
| 25% $NH_3$ aq. solution | 12.00 |
| Gluten | 20.00 |
| Reduced doped tungsten oxide | 1.00 |

Composition 2

| Components | Wt % |
| --- | --- |
| Water | 69.05 |
| Whey | 29.70 |
| Acticide SR 4485 (biocide) | 0.25 |
| Reduced doped tungsten oxide | 1.00 |

Composition 3

| Components | Wt % |
| --- | --- |
| Water | 78.95 |
| Egg white | 19.80 |
| Acticide SR 4485 (biocide) | 0.25 |
| Reduced doped tungsten oxide | 1.00 |

Composition 4

| Components | Wt % |
| --- | --- |
| Water | 78.71 |
| Beef 97% hydrolysate | 19.80 |
| Acticide SR 4485 (biocide) | 0.25 |
| Surfynol 104 DPM (surfactant/defoaming agent) | 0.25 |
| Reduced doped tungsten oxide | 1.00 |

Composition 5

| Components | Wt % |
| --- | --- |
| Water | 78.95 |
| 100% hydrolysed bovine collagen | 19.80 |
| Acticide SR 4485 (biocide) | 0.25 |
| Reduced doped tungsten oxide | 1.00 |

Composition 6

| Components | Wt % |
| --- | --- |
| Ethanol | 51.91 |
| Water | 2.78 |
| Dioctyl sodium sulfosuccinate (DSS) | 4.88 |
| Zein | 9.68 |
| Calcium oxalate hydrate | 12.20 |
| Reduced doped tungsten oxide | 1.56 |
| Cymel XW 3106 | 12.50 |
| Cycat 600 | 4.17 |

Composition 7

| Components | Wt % |
| --- | --- |
| Water | 35.00 |
| Ethanol | 35.00 |
| Zein | 29.00 |
| Reduced doped tungsten oxide | 1.00 |

Compositions 1 to 7 were each applied to an orientated polypropylene (OPP) polymeric film substrate at a coat weight of 5 gsm. The Compositions 1 to 7 remained on the substrates without any sign of displacement despite there being no binder in addition to the protein, demonstrating that the protein is functioning as both the binder and image-forming component of the composition.

Composition 6 was also applied to a further orientated polypropylene (OPP) polymeric film substrate at a coat weight of 5 gsm. A protective overcoat layer (a commercially available cold seal release lacquer from InkTech) was then applied over the composition on the substrate at a coat weight of 1 gsm.

Near-infrared radiation was applied to selected areas of the Compositions 1 to 7 on the substrates, and thus the protein on the substrates, using an NIR laser. The protein was denatured in the areas of Compositions 1 to 7 to which the radiation had been applied, thereby forming an image.

For each Composition, an opacity value was measured for both the imaged and unimaged (background) areas of the composition using a Techkon SpectraDens spectrophotometer according to ASTM standard ASTM D589-97. Results are shown in Table 1 below.

TABLE 1

| | Background Opacity (%) | Image Opacity (%) |
| --- | --- | --- |
| Composition 1 | 11.9 | 53.5 |
| Composition 2 | 2.1 | 54.7 |
| Composition 3 | 2.4 | 53.8 |

TABLE 1-continued

| | Background Opacity (%) | Image Opacity (%) |
| --- | --- | --- |
| Composition 4 | 1.6 | 47.7 |
| Composition 5 | 1.3 | 43 |
| Composition 6 | 5.4 | 72.4 |
| Composition 6 + protective overvarnish | 4 | 67.1 |
| Composition 7 | 1.9 | 56.1 |

Figure 1:
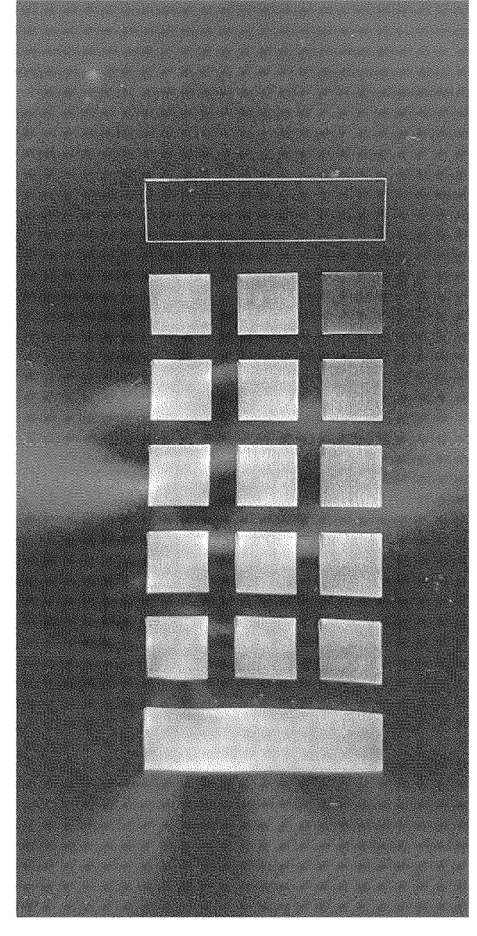
FIG. 1 demonstrates image formation using Composition 6 of the invention following application of radiation to selected areas of the composition on a substrate.

FIG. 1 shows image formation on the orientated polypropylene (OPP) substrate comprising Composition 6 following application of radiation to selected areas of the composition. In FIG. 1, the orientated polypropylene (OPP) substrate is held against a black Lenata chart. The squares (selected areas of the composition to which radiation has been applied) shown in FIG. 1 having different levels of opacity were achieved by alteration of the fluence of the NIR laser between 1 and 4 J/cm$^2$. The 'Image Opacity' value listed in Table 1 above for Composition 6 is of the square of highest opacity (bottom row, far right).

Water and environmental resistance of Composition 6 and Composition 8 (not according to the invention) were measured. Composition 8 was formulated as follows. All amounts are in weight percentage (wt %).

Composition 8

| Components | Wt % |
| --- | --- |
| Styrene acrylic emulsion with 25% ammonia solution (PAC 281-NH3) | 84.00 |
| Sodium molybdate hydrate | 15.00 |
| Reduced doped tungsten oxide | 1.00 |

Compositions 6 and 8 were each applied to an orientated polypropylene (OPP) polymeric film substrate at a coat weight of 5 gsm.

Composition 6 was also applied to a further orientated polypropylene (OPP) polymeric film substrate at a coat weight of 5 gsm, and a protective overcoat layer (a commercially available cold seal release lacquer from InkTech) was then applied over the composition on the substrate at a coat weight of 1 gsm.

Near-infrared radiation was applied to selected areas of the Compositions 6 and 8 on the substrates, using an NIR laser. The protein of Composition 6 was denatured in the areas of the composition to which the radiation had been applied, thereby forming an image. For Composition 8, at the selected areas of the composition to which the radiation had been applied, sodium molybdate hydrate underwent off-gassing, resulting in a change of refractive index and giving the appearance of image formation.

For each Composition, an opacity value was measured for both the imaged and unimaged (background) areas of the composition, using a Techkon SpectraDens spectrophotometer according to ASTM standard ASTM D589-97, both before and after complete immersion of the substrate in water for 24 hours. Results are shown in Table 2 below.

TABLE 2

| | Prior to 24 hour immersion | water | After 24 hour water immersion | |
|---|---|---|---|---|
| | Background Opacity (%) | Image Opacity (%) | Background Opacity (%) | Image Opacity (%) |
| Composition 6 | 5.4 | 72.4 | 13.2 | 71.7 |
| Composition 6 + protective overvarnish | 4 | 67.1 | 11.7 | 72.4 |
| Composition 8 | 4.8 | 45.5 | Background of composition was washed away | 11.9 |

It is thus clearly demonstrated that the compositions of the present invention comprising proteins facilitate the effective formation of discernible human and/or machine-readable images on a substrate. Furthermore, the compositions of the present invention also demonstrate increased water and environmental resistance in comparison to a composition of the prior art comprising sodium molybdate hydrate (Composition 8).

The invention claimed is:

1. A transparent or translucent composition comprising:
  a) a protein in a non-denatured state, wherein the protein can be denatured upon application of radiation to the transparent or translucent composition, and the protein is zein;
  b) an aqueous medium or a solvent; and
  c) a crosslinker,
  wherein the composition further comprises an NIR absorber selected from the group consisting of: inorganic copper salts; reduced indium tin oxide; reduced zinc oxide; reduced tungsten oxide; reduced doped tungsten oxide including an inorganic compound of the following formula $M_xW_yO_z$ where M is at least one element selected from the group consisting of H, He, alkali metal, alkaline earth metal, rare earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying $0.001 \leq x/y \leq 1$; and $2.2 \leq z/y \leq 3.0$; and reduced antimony tin oxide.

2. The composition according to claim 1, wherein the crosslinker is a melamine-based crosslinker.

3. The composition according to claim 2, wherein the crosslinker is an alkylated melamine-based crosslinker.

4. The composition according to claim 1, wherein the composition further comprises a catalyst.

5. The composition according to claim 4, wherein the catalyst is a sulfonic acid catalyst.

6. The composition according to claim 4, wherein the catalyst is dinonylnaphthalene disulfonic acid or dodecylbenzene sulfonic acid.

7. The composition according to claim 1, wherein the inorganic copper salt is copper (II) hydroxyl phosphate.

8. The composition according to claim 1, wherein the reduced tungsten oxide is a tungsten bronze.

9. A substrate comprising the transparent or translucent composition according to claim 1 applied thereto.

10. The substrate according to claim 9, wherein a protective overcoat layer is applied over the composition on the substrate.

11. A method of forming an image on a substrate, the method comprising applying radiation to the transparent or translucent composition of claim 1 that is on the substrate to denature the protein and form the image on the substrate.

* * * * *